March 11, 1924.
L. B. SKINNER
1,486,358
METHOD OF AND APPARATUS FOR CONDUCTING FURNACING OPERATIONS
Filed Feb. 19, 1920   6 Sheets-Sheet 1
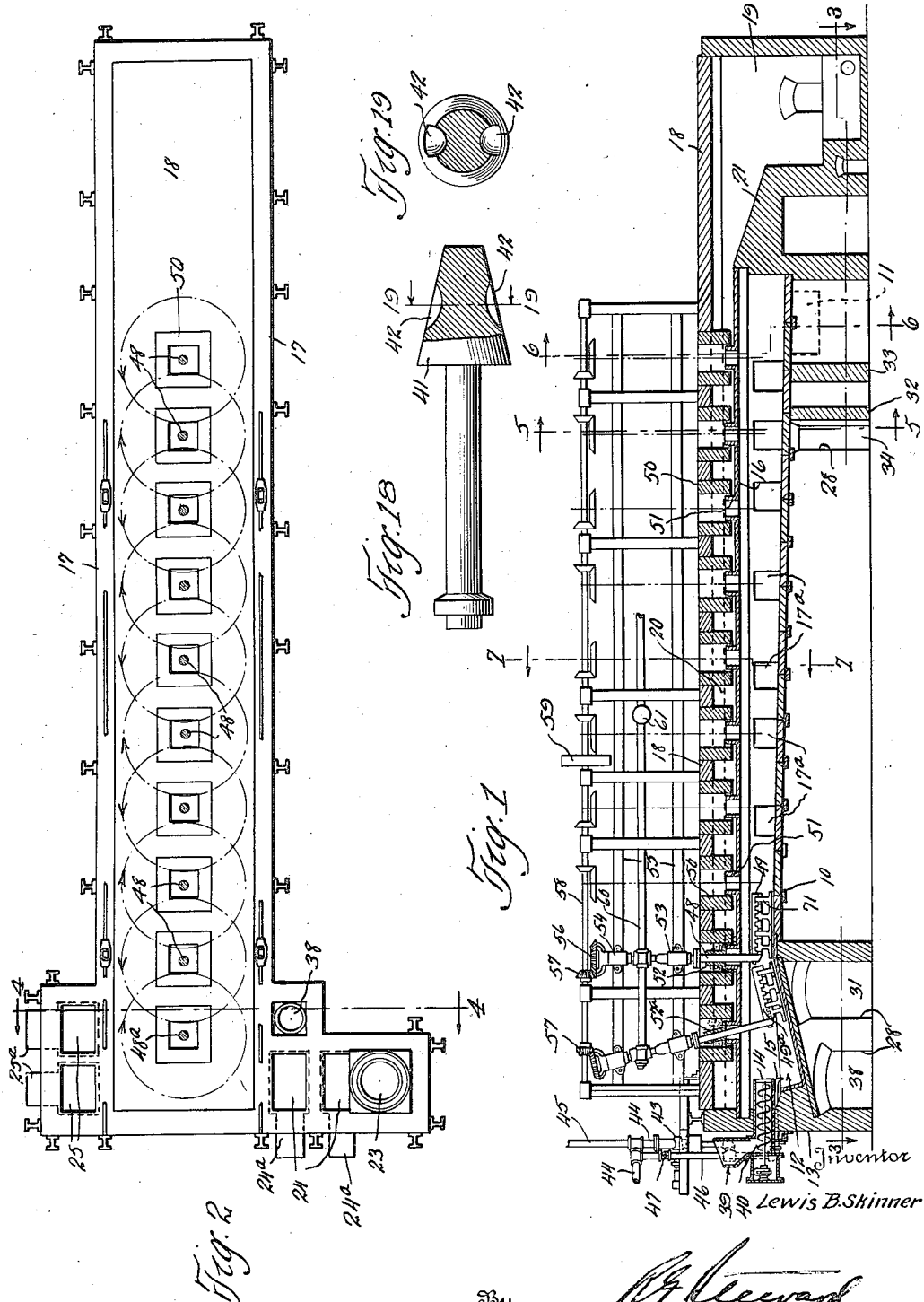

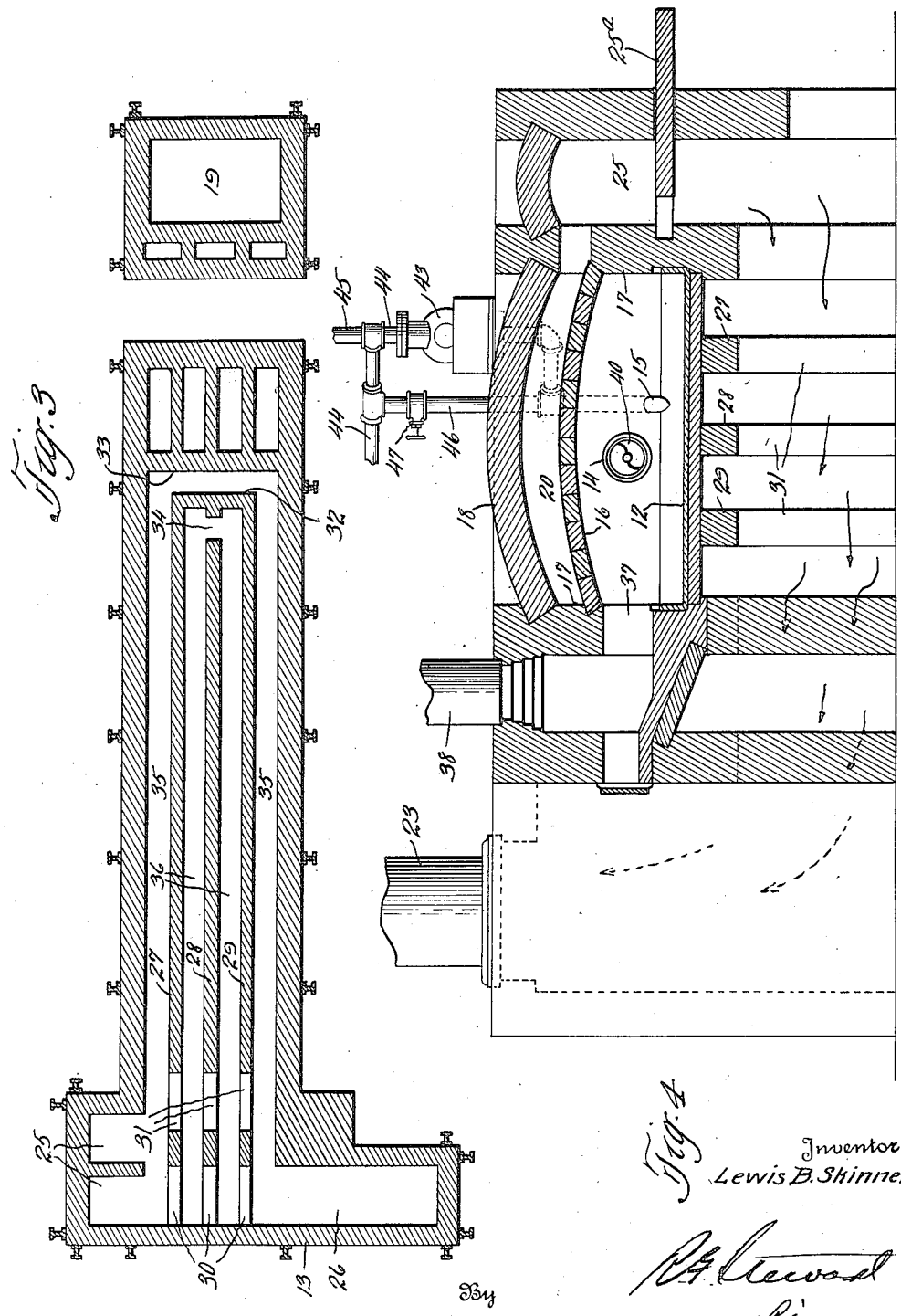

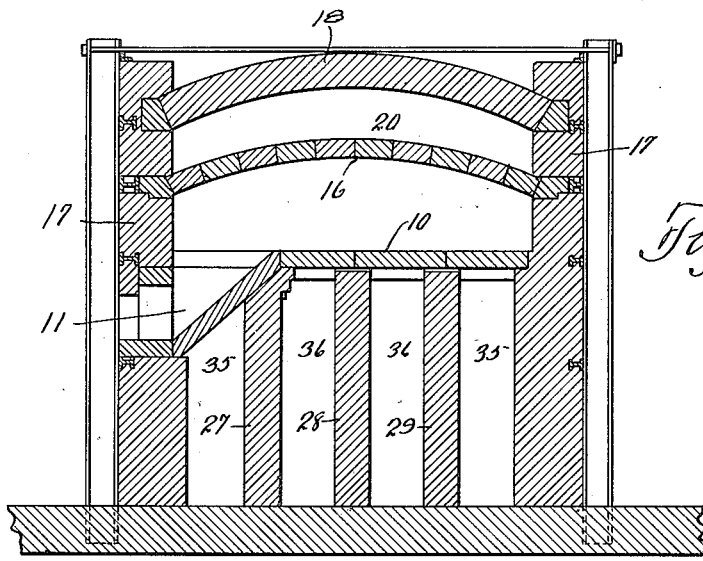
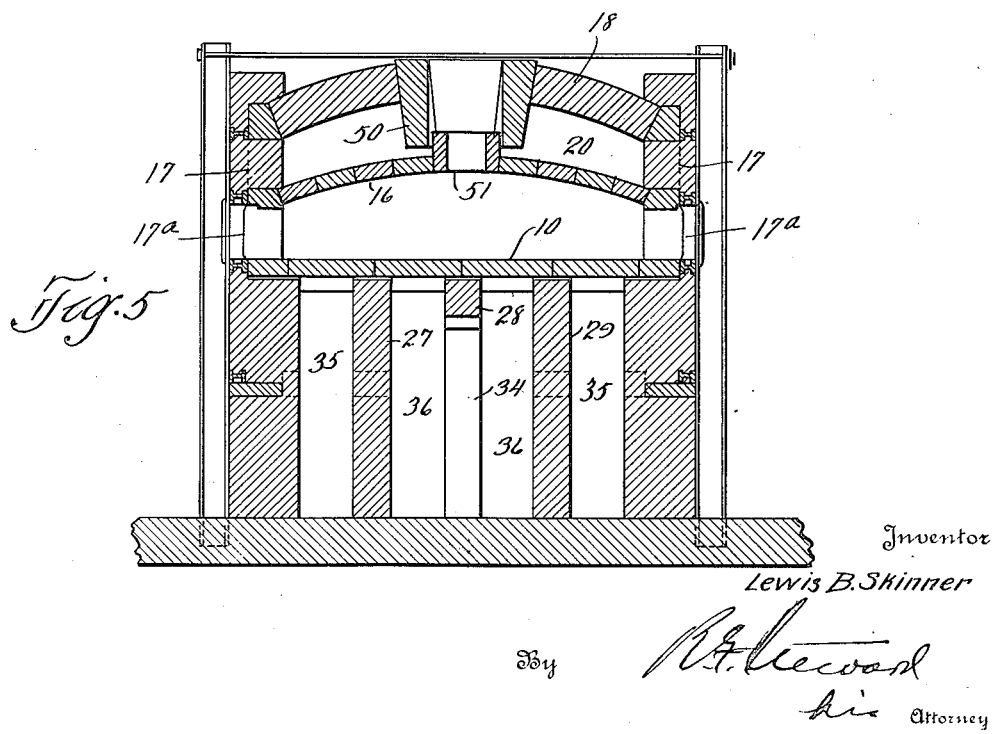

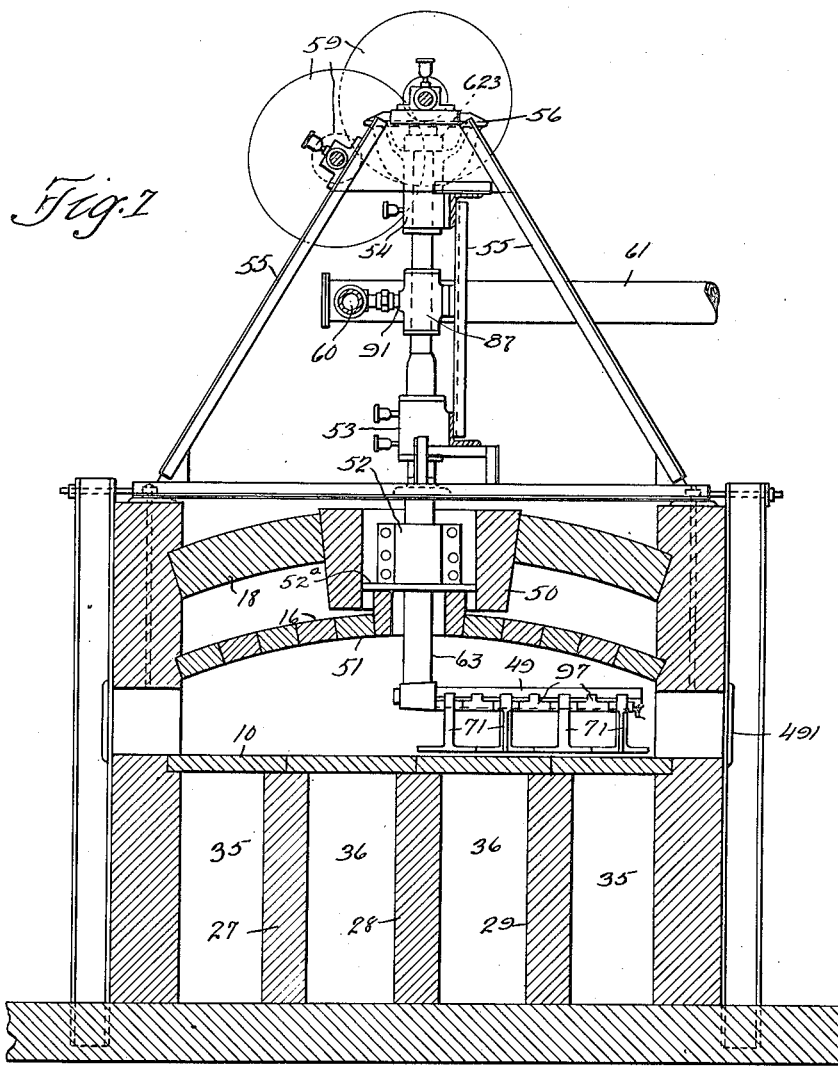

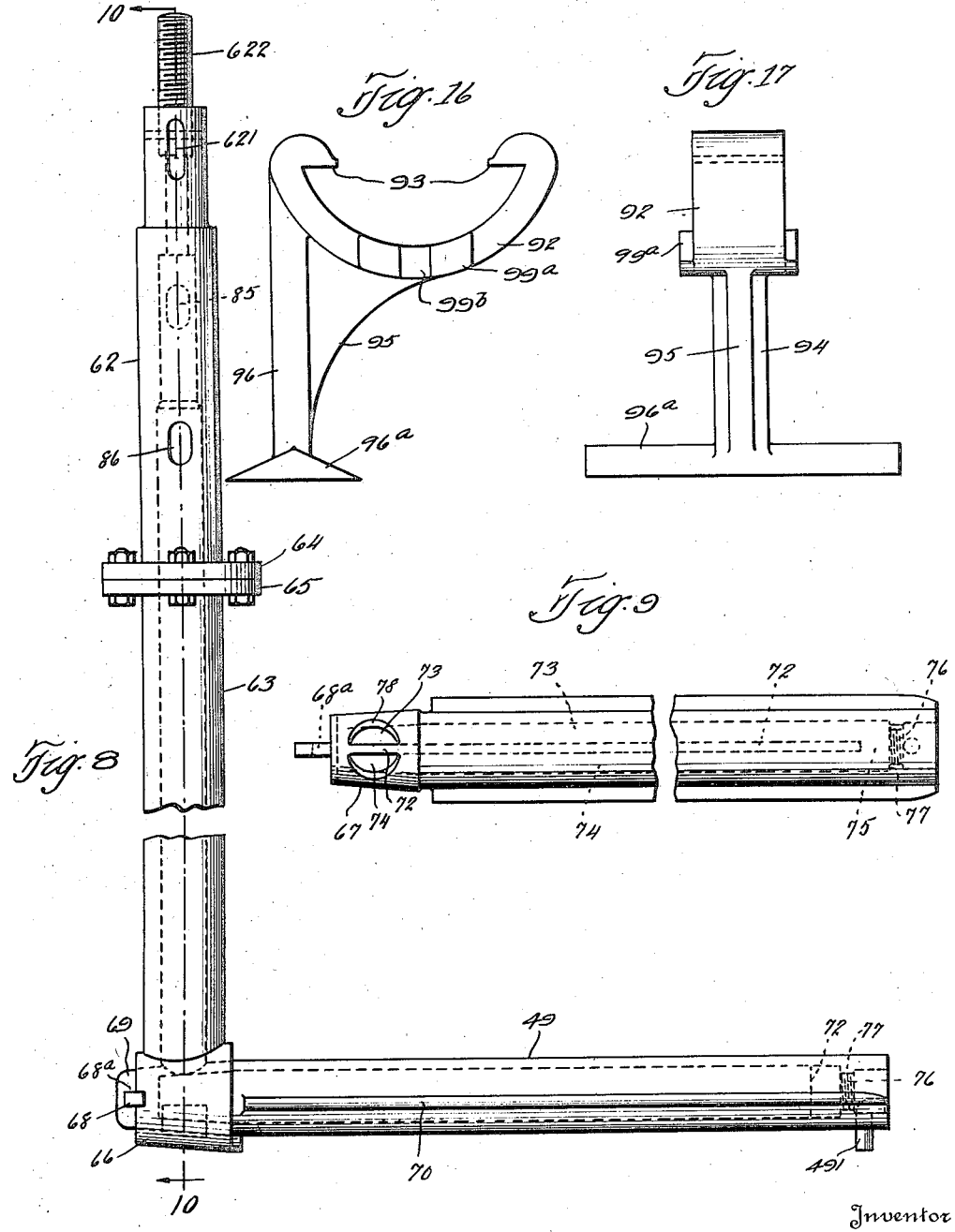

March 11, 1924. 1,486,358
L. B. SKINNER
METHOD OF AND APPARATUS FOR CONDUCTING FURNACING OPERATIONS
Filed Feb. 19, 1920   6 Sheets-Sheet 6
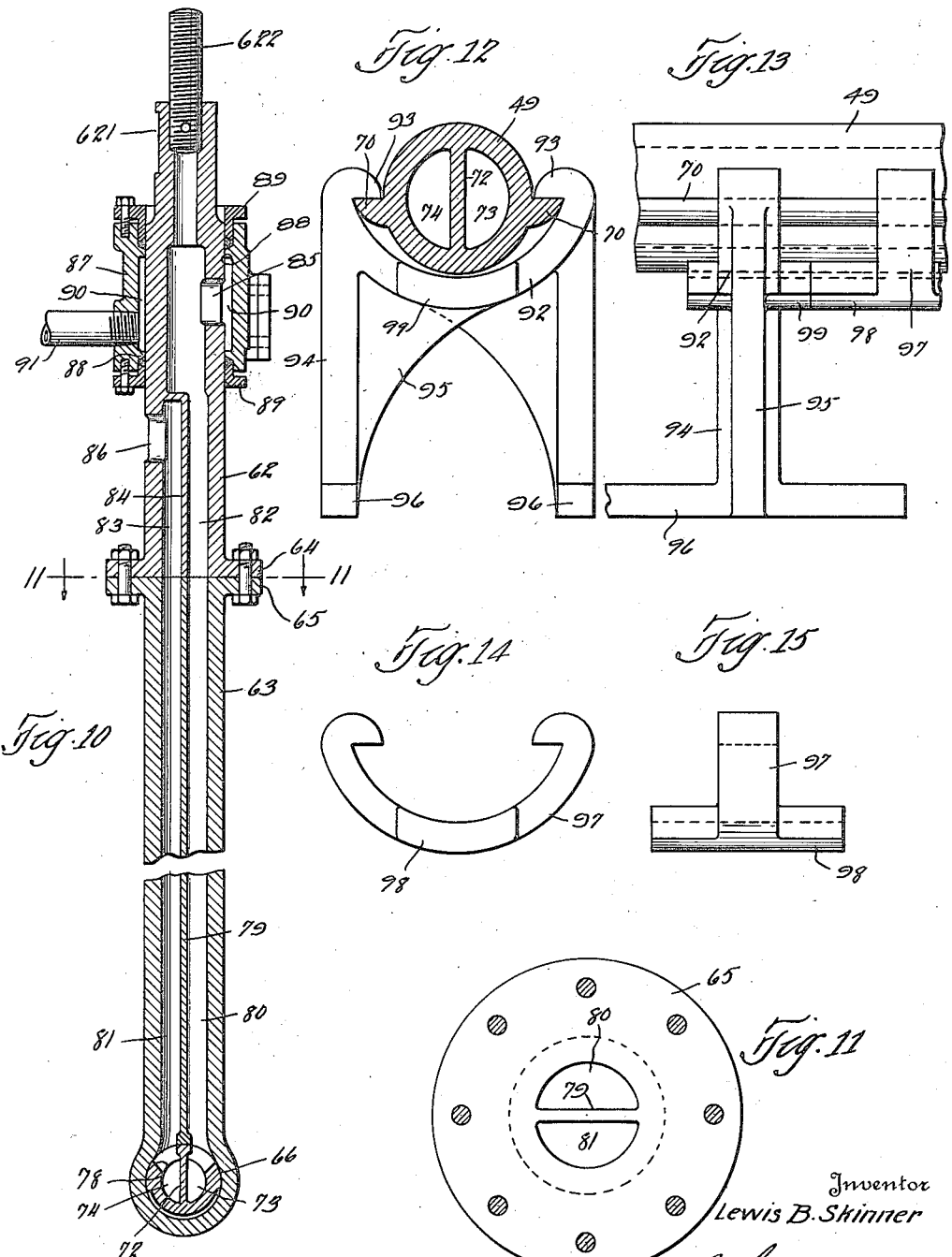
Inventor
Lewis B. Skinner Patented Mar. 11, 1924.

1,486,358

UNITED STATES PATENT OFFICE.

LEWIS BAILEY SKINNER, OF DENVER, COLORADO.

METHOD OF AND APPARATUS FOR CONDUCTING FURNACING OPERATIONS.

Application filed February 19, 1910. Serial No. 359,955.

*To all whom it may concern:*

Be it known that I, LEWIS B. SKINNER, a citizen of the United States, residing at Denver, in the county of Denver and State of Colorado, have invented certain new and useful Improvements in Methods of and Apparatus for Conducting Furnacing Operations; and I do hereby declare the following to be a full, clear, and exact description of the invention, such as will enable others skilled in the art to which it appertains to make and use the same.

This invention relates to methods of and apparatus for conducting furnacing operations; and it relates more particularly to the manufacture of muriatic or commercial hydrochloric acid and salt cake in a novel type of mechanical furnace. The invention, in so far as it relates to apparatus, has to do especially with furnaces of what may be termed a muffle or retort type for effecting chemical reaction, comprising an elongated rabble hearth to which a mixture of reacting materials is fed at one end and is advanced along the hearth toward the other end by rabbling or raking mechanism, the residual mass being finally discharged at such other end. While the apparatus and process of the invention are not necessarily limited in their application to the art of making muriatic or hydrochloric acid and salt cake, they find their greatest present utility in said art and they will accordingly be more particularly described hereinafter in connection therewith.

Various types of mechanical furnaces have been proposed heretofore for the manufacture of salt cake and muriatic or commercial hydrochloric acid; but so far as I am aware, none of these has proved highly satisfactory in practice. The principal difficulties encountered result from the characteristics and behavior of the raw materials and the resultant reaction mixture to be handled; and although these difficulties are most pronounced when the reagents employed are sulfuric acid and common salt, they are also experienced to a certain extent when niter cake (acid sodium sulfate) and salt are employed as starting materials.

In reacting between common salt and sulfuric acid, it is important that the salt be in sufficiently finely divided condition to ensure efficient reacting contact of the acid therewith; but on the other hand, the salt should not be too fine, because too rapid an attack by the acid would thereby be induced, resulting in excessive foaming and balling-up of the mixture. Under the most favorable conditions there is more or less tendency to balling up, that is, to formation of a coating over parts of the charge and cementing of these parts into balls which are only slowly penetrable by the acid. Where the salt particles are, say, approximately one-eighth of an inch in diameter, the reaction can be carried out most effectively. In practice, it is desirable to first form a soup-like mixture of the acid and salt or, as it is often expressed in practice, the salt should be dissolved in the acid charged. It has been found most satisfactory to use sulfuric acid known as "tower stock" which is 60° Baumé or 1.72 specific gravity with an acidity of approximately $77\frac{1}{2}$ per cent $H_2SO_4$, rather than to use stronger grades of acid. The action of this acid on the salt is sufficiently sluggish to permit the salt to "dissolve" in it. When salt and acid are mixed together, they form a liquid mass at ordinary temperatures, and the reaction between the two starts immediately with the evolution of hydrochloric acid gas mixed with some water vapor. Heat must be applied to keep the reaction going; and as more and more gases are evolved, the mass tends to thicken up and becomes difficult to rabble because it is neither wet nor dry but in a pasty or semi-viscous condition. As the heating is continued, hydrochloric acid gas and water are evolved until the residue tends to reach an almost dry state at a black-red temperature of from 400° to 500° C. The longer the time allowed for the calcination, and the more intimately the reagents are mixed together, the less is the necessity for a high finishing temperature; but if the mixing cannot be thoroughly effected, or if a relatively long period of time cannot be allowed for heating, a high finishing temperature must be used. Moreover, local overheating of even relatively dry material in this process results in fusion, which in turn causes scouring or fluxing of the hearth refractories, besides other troubles to be referred to hereinafter. The foregoing practical considerations impose certain conditions and requirements which mechanical furnaces heretofore proposed have failed to meet satisfactorily.

One type of mechanical salt cake furnace heretofore proposed is provided with a circular bowl-shaped hearth of cast iron in which it is proposed to mix the reagents and gradually work them to the rim of the hearth by means of mechanical stirring and rabbling mechanism. By reason of structural and operating limitations, the diameter of a furnace hearth of this kind cannot exceed about 14 feet as a maximum. This not only imposes a strict limitation as to capacity, but it has also been found that this type of furnace cannot be worked with a charge consisting of sulfuric acid and salt, but will operate satisfactorily only when confined to a charge of acid sulfate (niter cake) and salt. The reason for this is that with a small diameter furnace, such as that to which this type is necessarily limited, where the salt and acid are charged into the center, and with the rabble arms working the charge in spiral paths to the outer edge, the tendency toward foaming over or balling-up is so excessive that proper operation is precluded. On the other hand, by employing acid sodium sulfate and common salt as starting materials, small capacity operation is possible to a certain extent with a furnace of this character, because the absorption power of salt, or its "drying" property, does away with the necessity of handling either the initial "soupy" mixture characterizing operation with salt and sulfuric acid, or even the semi-liquid mass formed in an intermediate stage of such process. In other words, a circular hearth furnace such as that heretofore proposed, is really effective to perform only the last stage of calcining, with the mixture in such a dry condition that not all the above difficulties are encountered. However, even with niter cake and salt there is a tendency to form balls as a result of incipient fusion in the niter cake at the center of the furnace. The customary practice is to screen out the balls formed, recrush them, and put them back with subsequent charges, all of which entails undesirable annoyance and expense, besides diminishing the output.

It has also been proposed to increase the capacity of the circular type of furnace and to improve its practical operation, by providing a flat annular extension of the bowl-like portion, so as to prolong the period of calcination. This type of furnace has not given satisfaction, however, owing to the fact that, in accordance with the universal practice heretofore it has been sought to provide a large part of the calcining heat by means of flues lying underneath the hearth, which flues sooner or later become chocked up with material that fuses or liquefies on the hearth and seeps down through the intensely hot hearth into said flues.

In still another type of furnace it has been proposed to employ a relatively long rectangular muffle hearth, upon one end of which is charged a mixture of sulfuric acid and sodium chlorid, together with an "inert material" such as salt cake (normal sodium sulfate), the purpose of the salt cake being to produce a more solid reaction mixture which can be advanced to the opposite end of the hearth by mechanical propelling devices. This method of operation would obviously be inefficient, even if otherwise practicable, because of the inclusion in the charge of a large amount of "inert material;" but since the furnace as proposed is heated very largely by flues running underneath the muffle hearth, fusion or liquefaction of parts of the reaction mixture immediately in contact with the hearth occurs as the material is moved toward the discharge end, with consequent seepage through the hearth joints and stoppage of the underlying flues, in the manner already referred to.

Except in the above-described small capacity circular hearth type of furnace, which is not suitable for the employment of sulfuric acid and common salt, the hearths of all furnaces for this general purpose, as actually constructed, are necessarily built up of sections of refractory material such as fire-clay, tile, or the like; and the expansion and contraction of the component hearth sections, along with the corrosive action of the reaction materials, makes it practically impossible to maintain the joints tight. As a result, where the hearth is heated either wholly or in large measure by underlying flues, liquid and semi-liquid or pasty material undergoing treatment on such hearth passes down more or less slowly therethrough into the heating flues below, gradually blocking them up and thereby necessitating shut-down of the furnace for cleaning them out. It will be understood that this action occurs even where the initial charge consists of niter cake and acid instead of salt and acid.

The semi-viscous material that can flow into a joint in the floor will be immediately completely liquefied by the substantially higher temperature existing at the floor and within the body thereof (due to the underlying flues), and will run through. It will be apparent that, especially in the case of a hearth composed of low conductivity refractory material heated by underlying flues, the temperature increases from the upper to the lower surface thereof. Besides, the efficiency of heat transfer through the hearth is low by reason of the low heat conductivity thereof.

Another serious difficulty, before mentioned, is the corrosive or scouring action of pasty or semi-molten acid sulfate on the refractory materials of the hearth. Where the hearth itself is maintained very hot by underlying flues, as in the types of furnaces heretofore proposed for the manufacture of salt cake and muriatic acid, the fluxing action on the hearth is excessive, and the effect of this action in increasing the difficulties due to seepage of the reaction mixture through the hearth is therefore cumulative.

One of the principal objects of the present invention is to provide a mechanically operated furnace, and a novel method of furnace operation, whereby mixtures of sulfuric acid and common salt, or of niter cake and common salt, can be efficiently prepared, handled and advanced along the furnace hearth and thorough calcining effected under most favorable conditions and without the annoyance and trouble occasioned by leakage or seepage of material through the hearth, the whole operation being carried out in an economical and labor-saving manner. Another object of the invention is to provide a furnace construction involving a novel combination of mixing pan and calcining hearth of such character as greatly to facilitate mechanically handling and working the charge; and to provide a furnace in which the mechanical rabbling or stirring means employed to mix and handle the materials charged is of improved character rendering it especially applicable to employment in a furnace for the manufacture of salt cake and hydrochloric acid. Other objects and novel features of the invention will become apparent as the description proceeds.

Typical apparatus embodying the principles of the invention as applicable to a muriatic acid and salt cake furnace in which the present process can be carried out, is illustrated in the accompanying drawings, in which—

Fig. 1 is a central longitudinal section through the furnace;

Fig. 2 is a plan view, with certain parts removed;

Fig. 3 is a horizontal section on the line 3—3 of Fig. 1;

Fig. 4 is a vertical section on the line 4—4 of Fig. 2, drawn to larger scale;

Figs. 5, 6 and 7 are transverse sections on the lines 5—5, 6—6, and 7—7, respectively of Fig. 1;

Fig. 8 is a side elevation of a novel rabble shaft and rabble arm construction;

Fig. 9 is a plan view of a rabble arm;

Fig. 10 is a central longitudinal section on the line 10—10 of Fig. 8;

Fig. 11 is a transverse section on the line 11—11 of Fig. 10, at the coupling between the rabble shaft sections;

Fig. 12 is a transverse section, on a larger scale, through a rabble arm, showing, in end elevation, one suitable type of rabble tooth or plow mounted thereon.

Fig. 13 is a side elevation of the same viewed at right angles to Fig. 12;

Figs. 14 and 15 are end and side elevations, respectively, of spacers adapted to be mounted between the rabble teeth on the rabble arm;

Figs. 16 and 17 are end and side elevations, respectively, of a modified form of rabble tooth or plow;

Fig. 18 is a side elevation, partly in section of a part of a suitable acid-feeding device; and Fig. 19 is a transverse section on the line 19—19 of Fig. 18.

The particular furnace here chosen as an example to illustrate the principles of the invention, as regards both process and apparatus, is of the muffle type. As here shown the furnace comprises an elongated hearth 10, of which the major portion, which may be substantially horizontal, but most desirably slopes gently toward the salt cake discharge 11, as shown, is composed of sections and constitutes a rabble hearth of fire clay tile or other suitable refractory material, laid and supported in any well known or suitable manner, as shown.

The feeding end of the hearth, shown at the left in Fig. 1, is depressed to form a mixing pan or basin 12, this pan or basin being most desirably made of cast iron and formed in a single piece. The bottom of this pan may be substantially plane, sloping up towards the discharge rim or lip to join the main or major portion of the furnace hearth, which portion may for convenience be termed the finishing hearth. Through the front wall 13 of the furnace, project salt feeding means 14 and acid feeding means 15, whereby the proper amounts of salt and sulfuric acid may be fed to the receiving and mixing pan. In practice, the main rabble hearth or calcining hearth proper, that is, the portion 10, may desirably constitute about three-fourths or more of the entire combined length of the furnace hearth, including the mixing pan, which combination may be referred to generally as the furnace hearth. As here shown, the finishing hearth is substantially plane, but this is not indispensable. At a suitable distance above the furnace hearth is the muffle roof or arch 16, extending the full length of both the pot or mixing pan and the finishing hearth and supported on the side walls 17. In accordance with the invention, the muffle arch 16 should be of such character as to transmit heat readily from its upper external surface to the hearth below, and in this instance it is therefore composed of refractory material of much greater heat conductivity than fireclay brick, which latter have heretofore been employed in practice. For the purposes of the present invention, a muffle arch or roof of carborundum brick is particularly advantageous and is to be especially recommended, both because of the relatively high heat conductivity of carborundum and also because of its chemical inertness or passivity. A roof of this material transmits heat from the fire gases with the requisite rapidity, while at the same time it remains tight and seldom requires repair. Silica brick, though of somewhat lower heat conductivity than carborundum brick, are much more heat conductive than fireclay brick, and may therefore be employed within the scope of the invention. A metal muffle roof, one consisting of a series of arched iron castings arranged side by side and edge to edge, for example, is desirable from the standpoint of heat conductivity, but it is more difficult to keep such a roof tight.

Above the heat conducting muffle arch 16, and suitably spaced away therefrom, is a second arch 18, constituting the roof proper of the furnace. This outer arch or roof is composed of any suitable refractory material such as fire brick, tile, or the like. The arch 18 extends considerably beyond the hearth at the discharge end, forming the roof of the combustion chamber 19 of suitable firing means by which the furnace is supplied with heat. The firing means employed may be of any suitable character such as a gas producer, for example. The heating space 20 between the muffle arch 16 and furnace roof 18 communicates directly with the firing means, as shown, hot flame and flame gases from the latter thus being able to pass directly over bridge wall 21, into and through heating space 20, traveling longitudinally of the furnace adjacent the outer surface of the muffle arch 16, the heat conductivity of which is relatively high, as stated. In this way, the greater part of the available heat units in said flame and gases are therefore transmitted through the heat conductive muffle roof down upon the furnace hearth. The heating effect on the hearth is most intense near the end adjacent the firing means; and, in case an iron muffle arch is employed, the arch may be provided in that locality with a covering of suitable heat refractory material, such as firebrick, in order to prevent excessive deteriorating action on that portion of the muffle arch.

After passing through the heating space 20 above the muffle arch, the combustion gases, reduced in temperature, may be led through suitable flue means to the stack 23, either directly or after giving up further heat units to the mixing pot or pan by being caused to pass underneath the latter en route to the stack. In the present example, the flue system of the furnace is so arranged as to permit the flue gases to be led to the stack in either of these ways after passage over the muffle arch. Furthermore, in this particular instance, flue passages are also provided whereby the combustion gases after passing over the muffle arch, may also be led under the hearth on their way to the stack, where special conditions or circumstances may render this convenient or advisable either temporarily or continuously, to any desired extent. In carrying out the process of the invention under normal conditions, however, the finishing hearth is not ordinarily heated from below, if at all, to nearly as great an extent as from above, it being desirable, as will more fully appear hereinafter, that the under surface of the finishing hearth be at a lower temperature than the upper surface.

In the particular furnace construction here illustrated, two down flues or downcomers 24 and 25 are provided, one on each side of the furnace as shown in Fig. 2, for leading the gases downwardly from the heating space 20. Both downcomers 24 and 25 are provided with suitable dampering means $24^a$ and $25^a$, respectively, whereby flow of gases therethrough can be regulated and controlled in such manner as to direct said gases to and through any part of the underlying flue system. The arrangement and cross-sectional area of downcomer 24 is such that when it is fully open, the tendency is for all the gases coming from the heating space 20 to pass down through 24 into the flue 26 (Fig. 3) which leads directly to the base of the stack 23. In this case, all the fire gases are discharged directly to the stack without passing under either the finishing hearth or the mixing pan. In the construction here illustrated, there are three flue walls 27, 28, 29 extending underneath the rabble hearth, as best shown in Fig. 3, said walls being provided in the portion thereof underlying the pot or mixing pan, with arched ports 30 and 31 by which direct communication is afforded between the lower portion of the downcomer 25 and the stack flue 26. When the arched ports 30 and 31 are open, therefore, and if downcomer 24 be dampered to cut down the effective outlet capacity thereof to a sufficient extent, combustion gases will pass from the heating space 20 through downcomer 25, thence transversely under the pot to the stack flue 26, and thence to the stack.

It will be noted that, in the specific construction illustrated, the flue walls 27 and 29 are joined by a wall 32 near the discharge end of the furnace hearth, and that a transverse partition wall 33 is provided a short distance beyond 32. The center flue wall 28 is provided with an arched port 34 adjacent the wall 32. By virtue of this arrangement, two long U-shaped flue passages 35 and 36 are afforded, whereby, when the ports 30 and 31 of the center flue wall 28 are closed, as may be done by temporarily bricking them up, combustion gases can be made to pass through downcomer 25 into flues 35 and 36, through which they will flow underneath the hearth to near the discharge end thereof, and then back to the stack flue 26 and to discharge.

While the process of the present invention does not contemplate ordinarily heating the hearth from below by passing the flue gases through flues 35 and 36 as just described, it may nevertheless be convenient in preliminarily heating up the furnace, for example, or under special circumstances occasionally arising, to do this. But where the furnace here described is employed for the manufacture of muriatic acid and salt cake in accordance with my novel process, the long flue walls 27, 28 and 29 function principally as supporting piers for the furnace hearth. Moreover, where the furnace is to be used exclusively for practicing said process, it is entirely feasible to fill up the entire space underneath the hearth with filling material of suitable character and to dispense with the flues entirely. Or, the space under only the finishing hearth 10 may be filled up, and heating flues may be provided under only the pot or mixing pan.

In order to avoid escape of hydrochloric acid gas from the muffle into the combustion gases by leakage through cracks and crevices in the muffle walls and roof, it is desirable to maintain the combustion gases under a slight plenum, and to this end the gas producer or other firing means may be equipped with an underfeed stoker, or some other method may be adopted to attain the same result, such as locating the fire box in a pit, for example, or any other inverted siphon arrangement. The hydrochloric acid gas evolved in the muffle passes out through port 37 into a gas offtake 38, from which it passes to any suitable recovery system, such as an absorption train, not shown, through which the gases from the muffle may be drawn by an exhauster.

Any suitable means may be employed for feeding to the pan 12 the materials which are to react to form salt cake and muriatic acid. Most desirably the feeding means should be mechanically driven in such manner as to automatically supply the reacting materials in the proper chemically reacting proportions at all times. Where common salt and sulphuric acid are to be employed, as is assumed in the present example, the salt may be fed in from supply hopper 39 by a screw conveyor 40. The supply of sulphuric acid to the spout 15, which is arranged adjacent the salt feed and slightly above the mixing pan 12, may be satisfactorily regulated by the novel acid feeding device here shown, which comprises a rotatable plug or valve member 41, provided with cup-like depressions or recesses 42 and constantly ground into and held to a liquid-tight joint by a spring (not shown) in a valve seat or housing provided in a casing 43, interposed in acid line 44, leading from an acid supply tank, not shown. Vent or stand-pipe 45 should extend upward to a point somewhat above the highest level of acid in the supply tank. A by-pass 46 controlled by valve 47, permits cutting out the rotary acid-feeding mechanism altogether, or supplementing its normal supply of acid by feeding acid directly from line 44 to the spout 15. Both the salt feed and acid feed devices should be driven by suitable power means, and their operation should be so correlated as to ensure the delivery of proper proportions of the reagents to the pan 12. The particular acid-feeding mechanism and system here shown forms the subject matter of my copending application Serial No. 359,956, filed February 19, 1920, which has matured into Patent No. 1,375,643, April 19, 1921.

In order to advance materials from the mixing pan or pot 12 to the finishing hearth 10, and thence along the latter to the discharge end of the furnace, mechanically driven stirring and rabbling means are provided. Practical success in the use of mechanical rabbling devices in the manufacture of muriatic acid and salt cake, requires that the rabbling mechanism for this purpose be of special construction adapted to withstand the especially severe conditions of service to which it is subjected in such process. In the first place, it is essential that the mechanism be of such character that the various parts can be readily removed for repair or replacement, when necessary, and that it be possible to effect this quickly and easily without dismantling the furnace. Since the rabbling arms which carry the rabbles or plows are subject to the greatest wear and deterioration, it is important that these arms be separable from the rest of the mechanism and removable from the furnace without disturbing the associated parts to a serious extent. Another practically indispensable condition is that the rabbling mechanism comprise no parts, inside the muffle and expose to the acid gases and corrosive materials on the hearth, that move relatively to each other or rub one upon another. This is because the viscous material on the hearth would run into the joints or else the acid gases would penetrate the joints, thereby forming salts whose volume is several times that of the metal corroded thereby, and one or the other or a combination of both would ultimately stick the parts together. Or, if this did not occur, the rapid corrosion of the metal surfaces constantly being exposed by rubbing of the parts together would soon put an effective stop to operation in such a comparatively short time as to render the apparatus uncommercial. Furthermore, in order to maintain the rabbling mechanism serviceable for any substantial length of time, it is necessary to cool the same, and I have found that air-cooling should be resorted to for the reason that only by this method can the temperature of the mechanism be reduced sufficiently, and yet at the same time not so far as to permit condensation of aqueous hydrochloric acid on such parts of the mechanism as extend into the muffle. If water-cooling were employed, the water would so chill the metal of the rabble arms and shafts that, even though the water were allowed to come to boiling temperature, which is not feasible in practice, there would be condensation of sulfuric and hydrochloric acids on the surface of the metal, and the metal would be rapidly eaten away. Again, leakage of water into the muffle as a result of poor joints and corrosion would put a stop to operation by chilling the reaction mass to the point where reaction could not proceed with reasonable rapidity; moreover, the vapor formed would mix with the hydrochloric acid gases and dilute them to such an extent that a high strength muriatic acid could not be produced. With air-cooling, the air can be so regulated that the rabble arms and shafts are kept at a sufficiently low temperature to ensure maintenance of their strength and yet at a sufficiently high temperature to avoid condensation. Moreover, any leakage of air through a defective joint does not dilute the hydrochloric acid gas sufficiently to prevent its proper absorption in the absorption train, because far less "inert gas" thereby becomes mixed with the acid gas in the muffle than is introduced in the ordinary hand-operated pot and muffle, which latter must invariably be operated under sufficiently reduced pressure to pull in "false air" through the doors, through which the workmen operate the hand rabbles.

In view of the foregoing considerations, the mechanical rabbling mechanism employed in the present furnace apparatus for stirring and advancing the materials along the hearth, comprises a plurality of rabble shafts 48, composed of sections coupled together as will appear presently and extending through openings in the nature of ports or hatchways in the muffle arch 16 and outer arch or roof 18, each shaft carrying at its lower end a detachable rabble arm 49. The aforesaid hatchways are in the nature of stuffing boxes, each comprising a depending rim 50 mounted in the furnace roof 18 into which extends telescopically the upstanding rim 51 mounted in the muffle arch. A gland member 52 surrounds the rabble shaft and seats on a plate 52ª resting on the upper edges of the rim 51 and apertured to receive the rabble shaft. The space between the gland 52 and the rim 50 may be filled with sand or other suitable material to provide a suitable seal. The said rabble shafts 48 are disposed in the center line of the hearth and are supported in suitable bearings 53, 54, provided on a supporting framework 55 surmounting the furnace. Each shaft carries at its upper end a bevel gear 56, with which meshes a bevel pinion 57, carried on the driving shaft 58, which latter may be driven by any suitable power means through gearing indicated generally at 59. As will be hereinafter more fully explained in detail, the rabble shafts and arms are provided interiorly with cooling passages through which air may be circulated and then discharged outside the furnace. Cooling air may be introduced into each shaft, in a manner to be explained presently, from supply pipe 60, into which air is forced through main 61 by a blower, not shown; and after circulating through the cooling passages, the heated air may be discharged to atmosphere through openings with which the shafts are provided.

The detailed construction of the rabble shafts, arms, and teeth or plow members, is illustrated more particularly in Figs. 8 to 17, inclusive. Each rabble shaft consists of an upper section 62 and a lower section 63, coupled together by suitable fastening means such as bolts extending through coupling flanges 64, 65. The upper shaft section is provided near its upper end with a key-way 621 for keying the driving gear 56 to the shaft; and a threaded stud 622 (Fig. 8) closing the hollow end of the shaft is adapted to extend through the hub of said gear and to receive a securing and adjusting nut 623 (Fig. 7). The lower section 63 is provided with a transversely disposed tapering socket 66, adapted to receive the correspondingly tapered end 67 of the horizontal rabble arm 49, which may be removably secured to the rabble arm by means of a wedge-shaped key 68 extending through a slot 68ª, provided in the portion 69 of the rabble arm which projects through and to the rear of the socket 66, said key also lying in a groove in the rear face of the socket, thus ensuring correct positioning of the arm and preventing it from turning in the socket. Said rabble arms are provided with laterally projecting ledges or ribs 70, which serves as supporting means for rabble teeth or plows 71 suspended therefrom. The rabble arms are hollow and each is interiorly provided with a partition wall 72 which divides the space inside into two passages 73 and 74, which communicate only near the outer end of the rabble arm, as indicated at 75. In the particular construction here illustrated, the outer end of each hollow rabble arm is closed by means of a countersunk plug 76, screwed into position in an internally threaded boss 77, provided on the inner wall of the arm. The tapered end portion 67 of the rabble arm is provided with an opening 78, adapted to register with the lower end of the hollow interior of the lower rabble shaft section 63, which hollow interior is divided by the partition wall 79 into two independent air passages 80 and 81. When the rabble arm is properly positioned in the receiving socket 66, the division walls 79 and 72 abut, so that passage 73 registers with passage 80, and passage 74 registers with passage 81. Similarly passages 80 and 81 register with and constitute continuations of passages 82 and 83, respectively, into which the hollow interior of each upper rabble arm section is divided by partition wall 84. In this instance, cooling air enters the upper rabble shaft section from the air supply through an opening 85, and after passing successively through passages 82, 80, 73, 74, 81, and 83, is discharged to atmosphere through opening 86 in the upper rabble shaft section.

In order to supply cooling air to the intake 85 of each rotary rabble shaft, special means are provided. In the present example, each rabble shaft extends through a hollow cylindrical box or shell 87, which is secured to a member of the supporting framework 55, as shown in Fig. 7. At points above and below the intake 85, the box 87 is provided with internal annular spacing ribs 88 against which the rotary shaft may bear, and with which glands 89 cooperate to tightly pack the joint between the air box and the rotary shaft. An annular air intake space 90 thus entirely surrounds the rabble shaft section 62 at the location of the air intake 85 thereof; and into this annular space 90, air may pass from the air supply main 60 through pipe connection 91.

Since each rabble arm is adapted to revolve in a plane perpendicular to its actuating shaft, and parallel to that portion of the hearth with which it cooperates, the rabble shaft 48ᵃ and its rabble arm 49ᵃ, constituting the rabbling or agitating means for the mixing pan or basin 12, are mounted obliquely, as shown, in order that the rabble arm may swing in a plane parallel to the sloping bottom of said pan. In the particular arrangement here shown, this also necessitates an inclined gland member 52ᵃ as indicated.

As stated, the series of rabble shafts 48, 48ᵃ, are arranged in the center line of the gently sloping finishing hearth; and they are so spaced apart that their attached rabble arms describe intersecting circles as indicated diagrammatically in Fig. 2. The driving mechanism is so arranged that the successive rabble shafts rotate in opposite directions, as indicated by the arrows. As already pointed out, the rabble shafts are positively driven, with the rabble arms maintained in fixed angular position on the shafts, in such manner that the arms sweep overlapping hearth areas and at the same time miss each other. In an arrangement like this, where the series of rabble arms are caused to describe circles with the center of each circle just outside of the circles on either side thereof, the semi-solid chunks of reacting materials pushed up the inclined bottom of the mixing pot or basin 12, upon the finishing hearth, are pushed back and forth innumerable times during the general travel of the material toward the discharge end of the hearth by the series of cooperating revolving rabbles, and are gradually worn down by attrition and intimately mixed in such manner as to ensure completion of the reaction and ultimate production of salt cake substantially free of acid sulfate and common salt. It is to be understood also that the material fed upon the finishing hearth is of such semi-solid or viscous consistency, that the chunks tend to flatten or spread out upon the hearth, and in so doing are repeatedly broken up by the shearing action of the rabble teeth as their cutting edges sweep over the hearth. This shearing action, together with the attrition of the chunks as they are shifted back and forth by the revolving rabbles, results eventually in elimination of chunks, the final solid product being only salt cake, comparatively dry, friable, and free from any balls or chunks containing products of incomplete reaction, such as characterize the solid product resulting from mechanical processes heretofore proposed. It is to be observed that, during the shearing and attrition actions above described, the material is gradually advanced along the hearth toward the discharge end at a rate of speed depending upon the slope of the finishing hearth and the speed of rabble revolution.

A suitable form of rabbling tooth or plow for use in the present apparatus is illustrated in Figs. 12 and 13, where each plow or scraper comprises a curved yoke portion 92, adapted to fit around the under side of rabble arm 49, the arms of the yoke being provided with terminal hooks 93 adapted to rest on the upper surface of fins or flanges 70 of the rabble arm. Offset from the center line of the suspension yoke and integrally secured thereto through an arm 94 and stiffening web 95, is the scraper or shoe 96, which in this instance is rectangular in cross-section. In another form of rabble tooth which offers certain practical advantages, especially in the present apparatus, the shoe or scraper 96ª is triangular in cross section to provide a self-sharpening scraping or cutting edge, whereby the tooth more readily gets under and lifts material on the hearth, and also exerts a particularly effective shearing action. When the furnace is used in carrying out the process of the invention it is found desirable to leave a slight clearance between the shoes or scrapers of the rabble plows and the upper surface of the hearth. The reason for this will appear later.

The rabble teeth or plows are adapted to be strung in series on each rabble arm, being set in place on the lateral supporting ribs at the free end of the rabble arm and then slid along into position. In the arrangement here shown the rabble teeth alternate with spacers 97, which may be generally similar to the teeth but lacking the shoe or scraper. The projections 98 of each spacer abut extensions 99 of the teeth, thus maintaining the teeth properly spaced apart. In the form illustrated in Figs. 16 and 17, the tooth projections 99ª are grooved or recessed as at 99ᵇ to receive tongues (not shown) with which the spacer projections may be provided, to afford an assemblage of interlocked teeth and spacers. An angular stop-pin 491 keeps the teeth and spacers from working off the end of the rabble arm.

It will be observed that in the rabbling mechanism described, there are no mechanical parts within the muffle to rub or wear upon one another and thus to expose bright surfaces of metal to the action of the corrosive gases. Moreover, the construction of the rabbling mechanism makes it possible to replace any of the parts quickly and with little difficulty. Access to those parts of the mechanism within the muffle is easily had through the side doors 17ª. The rabble teeth or plows themselves are of such character and are so mounted as obviously to be readily replaceable on the rabble arms. The rabble arms, which are apt to break oftener than the upright rabble shafts can be detached from the latter simply by driving out the described locking wedge members 68, and the arms can then be withdrawn through the doors 17ª. Whenever necessary, the straight upright rabble shafts, after removal of the rabble arms, can be withdrawn upward through the openings in the furnace arches, which openings can therefore be much smaller than if each L-shaped combination of rabble shaft and arm were an integral construction.

One of the great advantages attained by employing the mechanical furnace here described is that it avoids the necessity for diluting the muffle gases with a large proportion of air that is necessarily drawn into the muffle of a hand-worked furnace by the fan, steam jet, or other exhauster means employed to pull the gases through the absorption train. Where hand-rabbling is relied upon, it is of course necessary to have the working doors at the sides of the hearth open a considerable part of the time, thus unavoidably admitting large quantities of air, as stated, and lowering the strength of the hydrochloric acid obtainable, preventing efficient absorption, and contaminating the atmosphere in which the operators work by admitting cold atmospheric air at the lower half of the working door and replacing the hot acid gas rolling out of the upper half.

In employing the described furnace apparatus to carry out the process of the invention, the intensely hot furnace gases first pass over the heat conductive arch 16 and transmit therethrough the greater part of their contained heat units to the finishing hearth below, some heat also being transmitted through the muffle arch to the mixing pan. The gases arriving at the feeding end of the furnace, much cooler but still containing available heat units, may be led directly to the stack through flue 26; or, if it is desired to further heat the mixing pan, any desired proportion of said gases may be caused to pass by way of downcomer 25 and ports 30 and 31, underneath the mixing pan 12. In the use of the furnace for making muriatic acid and salt cake, no part of the combustion gases is caused ordinarily to pass under the finishing hearth; but in case any part is so passed, it is most desirable that the proportion be so regulated or limited that the under side of the hearth is at a temperature lower than the upper side, and lower than the fusing or liquefying point of such portions of the reaction mass as may have worked their way partly through the hearth from the upper side. Under these circumstances, the semi-fluid material on the finishing hearth may trickle through joints or cracks in the sectional hearth but will solidify before it gets clear through the hearth, owing to the conditions of furnace operation just explained. Such material thus trickling to an isothermal line in the thickness of the hearth and solidifying, prevents the soft material following it from leaking through. The hearth thus being self-sealing under the conditions of operation described, the unavoidable cracking of the hearth from time to time, because of expansion and contraction with temperature changes, is a very much less serious matter than in furnaces heretofore proposed in this art, since such cracks are automatically filled up and sealed below by solidified salt cake, as described. The maintenance of these conditions is further ensured by giving the rabble teeth or plows a slight clearance above the hearth as already noted, whereby the formation of a very hard slab of salt cake on the hearth is permitted, this slab sticking to the material of the hearth itself and with it constituting a layer of material characterized by low heat conductivity.

The provision of an inclined mixing pan, with its stirring shaft and arm in non-parallel arrangement to the other units of the stirring and rabbling mechanism is an important feature. When salt and acid are charged into the pot 12, the mixed materials remain there until such time as a part of the batch thickens up due to the evolution of hydrochloric acid gas, the stirring mechanism 48ª, 49ª, having no propelling or advancing effect on any parts of the batch which have not reached this stage. This allows ample time for thorough mixing and so-called "solution of the salt" in the acid. Only when parts of the material in the pan form a thickened chunk as a result of the reaction do the rabble teeth function to forward this chunk into the circle which is being described by the next rabble arm in the series, and so on. Otherwise stated, the arrangement of the pan with its upwardly inclined bottom, followed by the downwardly inclined finishing hearth, in conjunction with the rabble mechanism, automatically accomplishes thorough mixture of the reagents and regulable advance of the same into and through the calcining zone to the salt cake discharge, in the desired manner. The long finishing hearth affords full opportunity for progressively heating the material to calcining temperatures as it is advanced toward the discharge end, with complete elimination of difficulties heretofore caused by balling-up; and the period of heating is accurately controllable by regulating the speed at which the rabbling mechanism is driven.

While the dimensions of the furnace apparatus may obviously vary in accordance with practical conditions and requirements, it may be stated that in a practical installation, a rectangular hearth having a total length of about 50 feet, including both the pan and the finishing hearth, and a width of about 7 feet, the mixing pan or pot occupying about 8 feet of this length, has been found to be a satisfactory design.

While a specific furnace structure and mode of operation have been described in detail hereinabove for the sake of affording a full understanding of the principles of the invention, it is to be understood that the invention is not limited to said details, and that various changes may be made in the construction and procedure illustrated and described without departing from the spirit of the invention.

What I claim is:

1. In the manufacture of muriatic acid and salt cake, the process which comprises feeding common salt and sulfuric acid to a mixing pot or pan, intimately mixing the same therein, moving partially solidified portions of the reaction mixture to and along a finishing hearth toward a point of salt cake discharge, said finishing hearth having a muffle roof of relatively high heat conductivity, transmitting heat to said hearth for the most part through said muffle roof and in such manner as to subject said mixture to progressively increasing temperatures as it travels toward said point of discharge, leading off acid gases from the muffle, and collecting discharged salt cake.

2. In the manufacture of muriatic acid and salt cake, the process which comprises mixing common salt and sulfuric acid in a mixing pan, transferring portions of the mixture to an elongated muffled finishing hearth having a roof of relatively high heat conductivity, and advancing the mixture along said hearth toward a point of discharge, heating said finishing hearth from above only, by passing hot furnace gases along said roof, and utilizing the residual available heat of at least a portion of said furnace gases to heat said mixing pan.

3. In the manufacture of muriatic acid and salt cake, the process which comprises feeding to a muffle hearth materials capable of reacting to produce muriatic acid and salt cake, advancing the reaction mixture along said hearth while progressively heating it to calcination temperatures, that portion at least of said hearth where calcination occurs being heated from above only, conducting away acid gases from the muffle and collecting discharged salt cake.

4. In the manufacture of muriatic acid and salt cake, the process which comprises advancing a mixture of the necessary materials along a calcining hearth heated from above, the temperature of said hearth being so controlled as to decrease from the upper surface downward to a locality at which the temperature is below the fusion temperature of salt cake.

5. In the manufacture of muriatic acid and salt cake, the process which comprises advancing a mixture of the necessary materials along an elongated calcining hearth of rectangular configuration heated for the most part from above, the mixture being subjected to progressively higher temperatures as it advances.

6. In the manufacture of muriatic acid and salt cake, the process which comprises advancing a mixture of the necessary materials along a calcining hearth by mechanical rabbling means spaced away from the upper surface of said hearth, and heating said calcining hearth from above exclusively.

7. The method of effecting reaction between reagents yielding a fusible non-volatile reaction product which comprises advancing the reaction mixture along a calcining hearth heated from above, the temperature above the hearth being above the fusion point of said product and the temperature of said hearth at a location below the upper surface thereof being kept below the fusion point of said product.

8. In the manufacture of muriatic acid and salt cake, the process which comprises intimately commingling common salt and sulfuric acid, continuously removing semi-solid portions of the mixture and muffling the same at gradually increasing calcining temperatures, leading off acid gases, and collecting calcined salt cake.

9. Furnace apparatus of the character described comprising, in combination, a mixing pot, a finishing hearth, firing means, a heat conducting roof over said pot, and said hearth, a discharge stack, and a flue system so arranged that hot gases from said firing means can be directed over the roof only of said mixing pot and said finishing hearth, and thence to said stack.

10. Furnace apparatus of the character described comprising, in combination, a cast iron mixing pot, a finishing hearth composed of sections of non-metallic refractory material, a carborundum muffle arch or roof above both said pot and said calcining hearth, a second arch or roof above and spaced away from said muffle arch, firing means from which hot combustion gases may pass into and through the space between the two arches, and flue means whereby all or a part of such gases, after having passed through said space, may be conducted under said mixing pot without passing under said finishing hearth.

11. Furnace apparatus of the character described comprising, in combination, an elongated hearth having its major portion inclined toward a point of discharge, and a depressed end portion constructed to hold liquid material, and rabbling mechanism adapted and arranged to transfer semi-solid material from said depressed end portion to said major portion and to move such material along the latter.

12. Furnace apparatus of the character described comprising the combination with an elongated hearth inclined toward a point of discharge and having a depressed portion at one end thereof, of mechanical rabble means operable to move material from said depressed portion to the opposite end of the hearth, and driving mechanism for said rabble means.

13. Furnace apparatus of the character described comprising the combination, with an elongated inclined muffle hearth having a depressed portion at one end thereof, of means for subjecting material on said hearth to temperatures increasing progressively from said depressed portion to the opposite end, mechanical rabble means operable to move material from said depressed portion to the opposite end of the hearth, and driving mechanism for said rabble means.

14. Furnace apparatus of the character described comprising the combination, with an elongated muffle hearth having its major portion inclined downward toward a point of discharge, and an end portion inclined upward to said major portion, of a series of rabble arms each revoluble about an axis substantially perpendicular to that portion of said hearth swept by said arm, said series of rabble arms cooperating to move material up said end portion of the hearth and along the hearth to the discharge end, driving mechanism for said rabble arms, and firing means whereby said material may be subjected to progressively higher temperatures as it is moved.

15. Furnace apparatus of the character described comprising the combination, with an elongated substantially plane muffle hearth having its major portion inclined downward to a point of discharge and an end portion inclined upward to said major portion, of means for feeding an acid and a salt to said end portion, rabble arms each revoluble about an axis substantially perpendicular to that portion of said hearth swept by said arm, said rabble arms cooperating to move material up the inclined end portion and along the hearth to the discharge end, and driving mechanism for said rabble arms.

16. Furnace apparatus of the character described, comprising a hearth having portions inclined downward in opposite directions from a point intermediate the ends of said hearth.

17. Furnace apparatus of the character described, comprising a hearth having portions inclined downward in opposite directions from a point intermediate the ends of said hearth, one of said portions being composed of a metallic vessel.

18. Furnace apparatus of the character described, comprising a hearth having portions inclined downward in opposite directions from a point intermediate the ends of said hearth, one of said portions being composed of a metallic vessel, in combination with mechanical rabbles arranged to advance material from one end of the hearth to the other.

19. Furnace apparatus of the character described, comprising a hearth having portions inclined downward in opposite directions from a point intermediate the ends of said hearth, one of said portions being composed of a metallic vessel, in combination with mechanical rabbles arranged to advance material from one end of the hearth to the other, said rabbles being arranged to give the material a back-and-forth movement while advancing the same toward the discharge end of the hearth.

20. In apparatus for making muriatic acid and salt cake, the combination, with an inclined calcining hearth, of a mixing pot operatively adjacent thereto and substantially continuous therewith.

21. In apparatus for making muriatic acid and salt cake, the combination, with an inclined calcining hearth, of a mixing pot operatively adjacent thereto and substantially continuous therewith, and mechanical rabbling means arranged to advance material from said mixing pot to and along said hearth.

22. In a unitary furnace structure for the manufacture of salt cake and muriatic acid, the combination, with an inclined calcining hearth, of a mixing pot substantially continuous therewith and adapted to discharge material upwardly upon said hearth.

23. In a muriatic acid and salt cake furnace, the combination, with a mixing pot, of a calcining hearth operatively adjacent thereto, means for feeding material from said mixing pot to said hearth, means for advancing material along said hearth and at the same time subjecting it to back and forth movement, and means for driving such feeding and advancing means.

24. In a muriatic acid and salt cake furnace, the combination, with a mixing pot, of a calcining hearth operatively adjacent thereto and inclined downward to a point of discharge, a plurality of cooperating rabble devices revoluble to sweep overlapping areas of said hearth without mutual interference, means for feeding material from said pot to said hearth, and driving means for said rabble devices and such feeding means.

25. Furnace apparatus of the character described comprising the combination, with an elongated rectangular muffle hearth composed of refractory material and roofed with a refractory material of relatively high heat conductivity, said hearth having a depressed portion at one end sloping up to a portion which slopes down in the opposite direction, of mechanical rabble means operable to move material from such depressed portion up to and along such second portion, driving mechanism arranged above the muffle roof and operatively connected to said rabble means, and means for directing heating gases along the exterior of said muffle roof.

26. Furnace apparatus of the character described comprising the combination, with an elongated rectangular muffle hearth composed of refractory material and having a roof composed at least in part of carborundum brick, said hearth having a depressed portion at one end sloping up to a main or calcining portion, of mechanical rabble means operable to move material from such depressed portion up to and along the calcining portion, driving mechanism arranged above the muffle roof and operatively connected to said rabble means, firing means located at the end of said hearth farthest from said depressed portion, a stack, and flue means whereby hot gases from said firing means may be directed longitudinally of said muffle roof along its outer surface, thence wholly or in part under said depressed portion of the hearth and thence to said stack, without passing under said calcining portion.

In testimony whereof I hereunto affix my signature.

LEWIS BAILEY SKINNER.